(12) United States Patent
Das et al.

(10) Patent No.: US 12,118,245 B2
(45) Date of Patent: Oct. 15, 2024

(54) FILE SYSTEM IMPROVEMENTS FOR ZONED STORAGE DEVICE OPERATIONS

(71) Applicant: MICROSOFT TECHNOLOGY LICENSING, LLC, Redmond, WA (US)

(72) Inventors: Rajsekhar Das, Sammamish, WA (US); Neeraj Kumar Singh, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/829,317

(22) Filed: May 31, 2022

(65) Prior Publication Data
US 2023/0409235 A1 Dec. 21, 2023

(51) Int. Cl.
*G06F 3/06* (2006.01)
(52) U.S. Cl.
CPC .......... *G06F 3/0659* (2013.01); *G06F 3/0604* (2013.01); *G06F 3/0643* (2013.01); *G06F 3/067* (2013.01)
(58) Field of Classification Search
CPC .... G06F 3/0604; G06F 3/0643; G06F 3/0659; G06F 3/067
See application file for complete search history.

(56) References Cited

U.S. PATENT DOCUMENTS 11,137,920 B1 * 10/2021 Bert ...................... G06F 3/0673
2015/0212740 A1 * 7/2015 Dewey .................. G06F 3/0604
711/171
2020/0089407 A1 3/2020 Baca et al.
2020/0167274 A1 * 5/2020 Bahirat .................. G06F 3/0644
2020/0349121 A1 11/2020 Lee et al.
2021/0089217 A1 3/2021 Bjrling et al.
(Continued)

OTHER PUBLICATIONS

"Samsung Introduces Its First ZNS SSD with Maximized User Capacity and Enhanced Lifespan", Retrieved From: https://news.samsung.com/global/samsung-introduces-its-first-zns-ssd-with-maximized-user-capacity-and-enhanced-lifespan, Jun. 2, 2021, 3 Pages.

(Continued)

*Primary Examiner* — Aracelis Ruiz
(74) *Attorney, Agent, or Firm* — Newport IP, LLC; Jacob P. Rohwer

(57) ABSTRACT

The techniques disclosed herein enable systems to efficiently interface with zoned namespace (ZNS) storage devices through a specialized management entity. To achieve this, the management entity receives write requests from a file system containing data intended for storage at the ZNS device. In response, the management entity selects a zone from the ZNS device to write the file data to. Accordingly, the file data is written by appending the file data to the zone at a location indicated by a write pointer. When the write operation is completed, the offset of the file data within the zone is observed and recorded by the file system in file metadata. In contrast to typical systems which allocate locations at the storage device prior to writing, appending file data and then recording the location enables improved efficiency in file system operations. Namely, that write operations can be issued to the ZNS device non-serially.

20 Claims, 10 Drawing Sheets

(56) References Cited

U.S. PATENT DOCUMENTS

| | | | |
|---|---|---|---|
| 2021/0182166 A1* | 6/2021 | Hahn | ................... G06F 3/064 |
| 2021/0263674 A1 | 8/2021 | Shin et al. | |
| 2021/0318801 A1 | 10/2021 | Benisty et al. | |
| 2022/0244869 A1* | 8/2022 | Kanteti | ............... G06F 3/0631 |

OTHER PUBLICATIONS

"Zoned Storage Now Encompasses Both HDD & SSD Technologies", In White Paper of Western Digital, Jan. 12, 2022, 12 Pages.

Bjørling, Matias, "New NVMe™ Specification Defines Zoned Namespaces (ZNS) as Go-To Industry Technology", Retrieved From: https://nvmexpress.org/new-nvmetm-specification-defines-zoned-namespaces-zns-as-go-to-industry-technology/, Jun. 18, 2019, 4 Pages.

Dobson, et al., "Testing Zoned Namespace SSDs with SVF Pro/Enduro", Retrieved From: https://www.eetasia.com/testing-zoned-namespace-ssds-with-svf-pro-enduro/, Jul. 14, 2021, 8 Pages.

"International Search Report and Written Opinion Issued in PCT Application No. PCT/US23/018427", Mailed Date: Jul. 6, 2023, 11 Pages.

* cited by examiner

FILE SYSTEM IMPROVEMENTS FOR ZONED STORAGE DEVICE OPERATIONS

BACKGROUND

As the scale and complexity of computing rapidly increases, demand for high-speed and high-capacity storage naturally increases as well. With the advent of solid-state devices modern storage systems often boast much higher speeds in comparison to traditional mechanical devices such as hard-disk drives. However, while solid-state devices offer high speeds, mechanical devices can provide comparatively higher storage capacity. As such, despite advances in the capacity of solid-state devices, large-scale systems can achieve high storage density.

In a large-scale context such as a datacenter, storage density can be a key consideration for operators as increasing storage density can reduce the space required to house the hardware for a given volume of storage. For example, power and cooling oftentimes represents a significant portion of operating costs for a datacenter. Consequently, by increasing storage density, the operator can reduce the costs associated with maintaining, cooling, and otherwise operating large-scale storage solutions.

To that end, many advances in storage device architecture have greatly improved storage capacity in solid-state drives (SSDs) such as quad-level cells (QLC). In addition, effective methods for interfacing with SSDs such as the non-volatile memory express (NVMe) standard enable computing systems to utilize improvements in storage technology and thus improve density. One such innovation is zoned namespaces (ZNS), an extension of the NVMe standard that introduces many operational improvements by enabling an SSD to align digital data to the physical hardware storage media. In contrast to the blocks of storage exposed by typical SSDs, ZNS devices organize storage media into zones. As a result, ZNS enables an SSD to expose greatly increased storage capacity, reduces computational waste associated with write amplification, and reduces access latencies.

However, ZNS also imposes an operational paradigm at the software level (e.g., file systems) that can hamper efficiency if left unaddressed. For example, to enable various abstractions that support file system activity, typical SSDs utilize a flash translation layer (FTL) that acts as an intermediary between the file system the physical media of the SSD. However, the FTL itself requires computing resources and memory, the demands of which increase proportionally with the density of the SSD. This increasing demand leads to increased device latency. Moreover, the FTL represents a significant fraction of the cost for an SSD which similarly inflates as capacity grows. To address these issues, ZNS exposes an interface that lies closer to the physical media of the SSD thereby eliminating complexity and enabling the various benefits mentioned above.

SUMMARY

The techniques disclosed herein improve the functionality of file systems for interfacing with zoned namespace (ZNS) solid-state storage devices by the introduction of a file system management entity. Generally, the management entity can be a component and/or an extension of a file system for enabling efficient interfacing with a ZNS storage device. The management entity can process write requests and append file data to the zones of the ZNS device. As described in more detail below, appending file data enables improved efficiency while realizing the benefits of ZNS devices. It should be understood that file data can be any form of digital data such as text, audio, video, and the like.

In various examples, the management entity receives write requests from the file system. Typically, write requests are generated by various applications such as text editors, web browsers, or other applications that implement functionality for storing file data and provided to the file system for execution. Alternatively, write requests are generated by the file system in response to a command from an application. An individual write request can include file data that is to be written to the storage device and a data quantity defining a volume of the file data.

To process a write request, the management entity selects a zone from the ZNS storage device to store the file data. As will be discussed further below, the management entity can utilize diverse criteria to select a zone such as the volume of available space, relevance of the file data to other data within a zone, and so forth. Once selected, the management entity can execute the write operation and append the file data to the selected zone. Zones of the storage device can be configured in any suitable format. For instance, a zone can correspond to a physical chip of flash storage. Alternatively, a single chip may be partitioned into several zones. Moreover, one zone can comprise several constituent subzones which can be individually interfaced by the file system via the management entity.

Once the file data is appended to the selected zone, the management entity calculates an offset of the file data within the zone. The offset of the file data can be expressed as a location relative to a starting point of the zone. For example, if there is no other data in the selected zone, the offset can simply be the starting point. In another example, the offset of the file data can be calculated using the occupied space of the selected zone and the data quantity of the write request.

Following completion of the write operation, the management entity returns a zone identifier and the file data offset to the file system. It should be understood that zones can be identified using any suitable method such as a simple numbering scheme, memory addresses, hardware identifiers, and so forth. As will be discussed below, observing the location of file data after completion of the write operation is counter to many existing file systems, which select a location and then perform the write operation.

Accordingly, the zone identifier and the file data offset are recorded in file metadata that is associated with the file data. In various examples, the file metadata can define properties of the file data such as a file name, timestamps for creation and last edit. In addition, while file data can be stored in a zone of the ZNS storage device, file metadata may be stored in a secondary storage device such as a conventional SSD. In this way, the file system can minimize inefficiencies associated with file metadata operations which can highly coupled in nature. Stated another way, file metadata can be dependent on other pieces of file metadata which can require extra processing.

The techniques address several technical challenges associated with utilizing ZNS storage devices for a data storage solution. For instance, zones of a ZNS device can be vary in size between individual devices. Stated another way, while a first ZNS device may comprise zones that are one hundred megabytes in size, a second ZNS device may have zones that are one hundred and fifty megabytes in size. In contrast to traditional file systems, the management entity can be cognizant of variable zone sizes between devices. In this way, the management entity can ensure smooth operations irrespective of the hardware configuration of an individual storage device.

In another technical benefit of the present disclosure, the techniques discussed herein can enable a file system to perform input/output (I/O) operations in a ZNS device non-serially. While existing methods for interfacing with ZNS devices write to a specific location within a zone (e.g., an address), the management entity forgoes selecting a particular address and rather appends file data to the selected zone. As mentioned above, once the write operation is completed, the management entity can observe the file data to calculate an offset of the file data within the selected zone to determine the location of the file data. In this way, the management entity does not need to expend additional computing resources to determine if a specific location was already allocated for a different write operation. Consequently, write operations can be provided to the ZNS storage device in any order and without concern for overwriting other file data.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The techniques described herein provide systems for enhancing the functionality of file systems by the introduction of a management entity to enable efficiency interfacing with zoned namespace (ZNS) storage devices. As mentioned above, the management entity is configured to handle and optimize operational peculiarities of ZNS devices. For example, the management entity executes a write operation by selecting a zone of the ZNS device to which file data is appended. Following completion of the write operation, the management entity observes the location of the file data within the zone as an offset. A zone identifier and the offset are then recorded in file metadata associated with the file data.

The disclosed system addresses several technical problems associated with utilizing ZNS devices in modern storage solutions. Namely, that many existing file systems are incompatible with ZNS devices. For example, while organizing storage media into zones enables increased storage capacity many file systems lack mechanisms for correctly interfacing with the zones of ZNS devices. Consequently, despite the many benefits of ZNS devices, typical file systems are simply unable to realize them due to the unconventional architecture. In contrast, by introducing a management agent as described herein, the disclosed system enables a file system to utilize ZNS devices to enhance modern file systems.

Moreover, even file systems that are configured to interface with ZNS devices oftentimes sacrifice efficiency to do so. For instance, existing methods for enabling a file system to interface with ZNS devices impose serial write operations due to conventional file allocation approaches. Specifically, existing file systems store file data by first selecting a storage location at the storage device (e.g., an address within a zone) and subsequently writing the file data to the location. However, writing data to ZNS devices in this way requires that the entire zone be erased and then written sequentially. As such, writing file data using typical approaches leads to significant latencies when operating with ZNS devices. To address this challenge, the disclosed system forgoes selecting a specific location prior to writing file data and rather selects a zone. The file data is then appended to the zone and the resulting location is extracted by the management entity. In this way, the file system can perform write operations non-serially thereby increasing the efficiency of the file system with respect to ZNS devices.

Various examples, scenarios, and aspects that enable the techniques are described below with respect to FIGS. 1-7.

Figure 1:
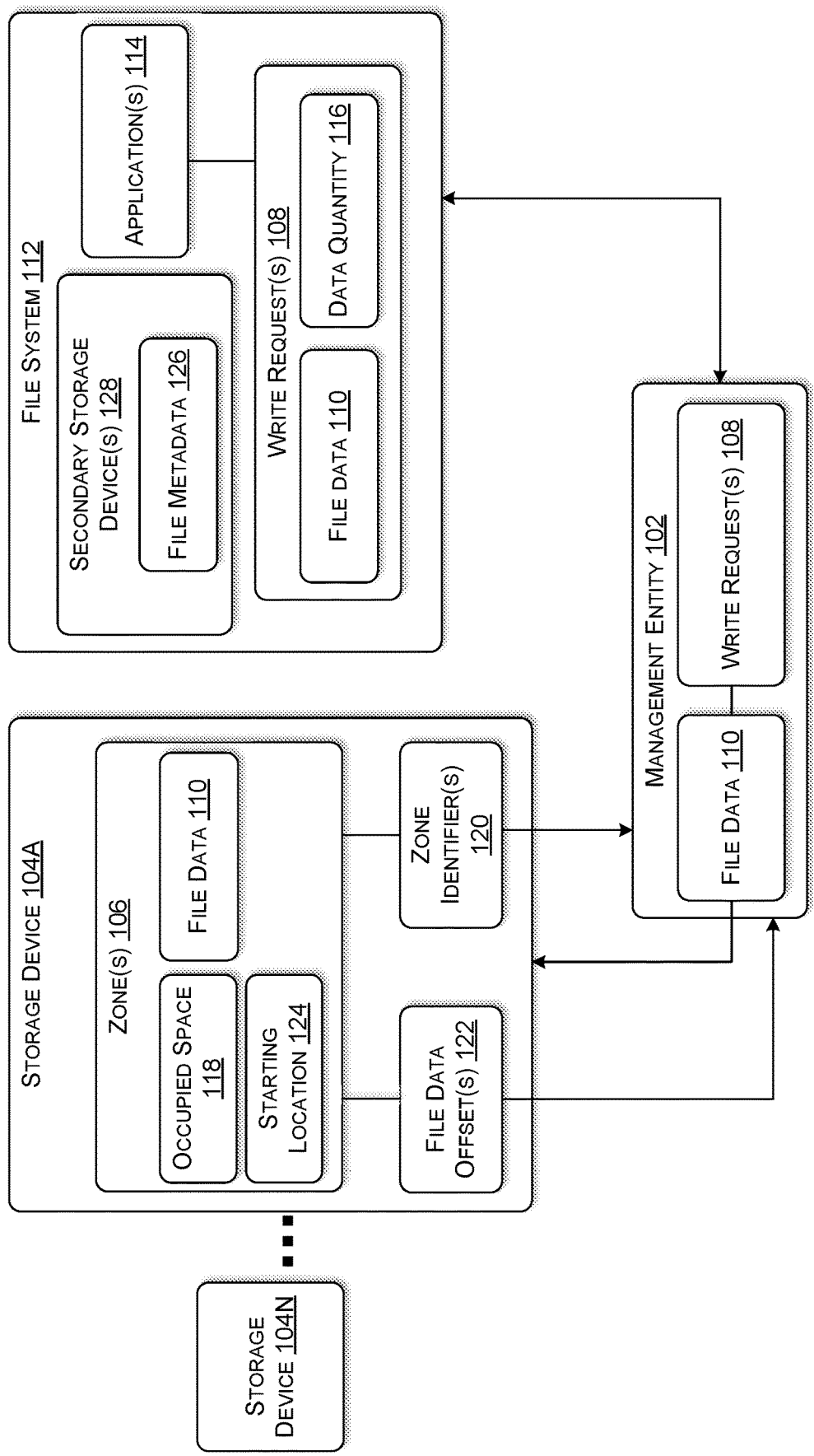
FIG. 1 is a block diagram of an example system for interfacing a file system with a zoned namespace storage device.

FIG. 1 illustrates a system 100 in which a management entity 102 provides efficient interfacing with storage devices 104A-104N (e.g., zoned namespace (ZNS) storage devices). While many examples provided herein are described with respect to ZNS devices, it is understood in the context of this disclosure that the techniques can be applied to any storage device 104 that contains zones 106 of storage media. In addition, while many examples are described in the context of a single storage device 104A, it should be understood that the management entity 102 can interface with a plurality of storage devices 104A-104N.

In various examples, the management entity 102 is one or several hardware and/or software components that receive and process write requests 108 for file data 110 from a file system 112. Typically, a write request 108 can be generated by an application 114 when the application 114 wishes to store file data 110 for future use. The applications 114 include any computer program designed to carry out a task as defined by computer-readable instructions. Furthermore, file data 110 includes any digital information that is generated and/or stored by a computing system such as the system 100. For example, file data 100 can be data defining a text document, an audiovisual file, a computer program, and so forth. In addition to the file data 110, a write request 108 can include a data quantity 116 defining a volume of the file data 110 to be written. In a specific example, the file data 110 is a video file while the data quantity 116 indicates that the file data 110 is one hundred megabytes in size.

The write request 108 is then provided to the management entity 102 for processing. It should be understood that the file system 112 can alternatively dispatch several write requests 108 to the management entity 102 for simultaneous processing. Accordingly, the management entity 102 extracts the file data 110 from the corresponding write request 108 and selects a zone 106 of the storage device 104A for storing the file data 110. The zone 106 can be selected by the management entity 102 using various criteria such as the occupied space 118. Using the occupied space 118, the management entity 102 can determine whether the file data 110 can fit within a given zone 106. Furthermore, the management entity 102 can be configured to select zones based on the application 114 which generated the initial write request 108. In this way, instances of file data 110 that originate from the same application 114 can be stored within the same zone 106. Furthermore, the management entity 102 can select a plurality of zones 106 to storing file data 110 extracted from a plurality of write requests 108. In one example, the management entity 102 selects one zone 106 for each write request 108. In another example, the management entity 102 receives a first plurality of writes requests 108 from a first application 114 and second plurality of write requests 108 from a second application 114. Accordingly, file data 110 from the first plurality of write requests 108 are written to a first zone 106 while the file data 110 from the second plurality of write requests 108 are written to a second zone 106.

Once the zone 106 is selected by the management entity 102, a write operation is executed where the file data 110 is appended to the zone 106. Following completion of the write operation, a zone identifier 120 and a file data offset 122 are returned by the zone 106 to the management entity 102. In various examples, the zone identifier 120 is a numerical identifier of the zone 106 in which the file data 110 is stored. For instance, the zone identifier 120 can utilize a hexadecimal numbering scheme, a decimal numbering scheme, and the like. In an alternative example, the zone identifier 120 is an alphanumeric identifier utilizing both letters and numbers to identify the zone 106. In addition, the file data offset 122 can identify a location of the file data 110 within the zone 106 and can be expressed relative to a starting location 124 of the zone 106. The starting location 124 can be a memory address, a hardware identifier, or other suitable method to indicate the beginning of a zone 106. In one example, the file data offset 122 is a sum of the starting location 124 and the occupied space 118 to indicate a location within the zone 106 at which the associated file data 122 begins. Like the starting location 124, the file data offset 122 can be expressed as a memory address, hardware identifier, or other suitable method to indicate a starting point of the file data 110.

Moreover, the file data offset 122 can include an ending point of the file data 110 which can also be expressed as a memory address, hardware identifier, or other suitable method. The ending point can be calculated using the data quantity 116. For instance, a starting point of the file data 110 is calculated using the starting location 124 of the zone 106 and the occupied space 118. The ending point of the file data 110 can accordingly be calculated using the data quantity 116 and the starting point of the file data 110.

Accordingly, the management entity 102 can respond to a write request 108 by returning the zone identifier 120 and the file data offset 122 for the file data 110 to the file system 112. In many examples, file metadata 126 associated with the file data 110 is updated with the zone identifier 120 and the file data offset 122. The file metadata 126 can define various characteristics of the associated file data 110. In one example, the file metadata 126 defines a file name, a file type, a date of creation, and so forth. The file metadata 126 enables the file system 112 to keep track of file data 110 and can be updated over time as the file data 110 is moved and/or modified. In various examples, the file metadata 126 is stored on a secondary storage device 128 that is different from the zoned storage device 104A. In one example, the storage device 104 is a ZNS device while the secondary storage device 128 is a conventional solid-state storage device. By storing the file data 110 and the file metadata 126 separately, the system can minimize potential conflicts between differing datasets. Furthermore, by storing the file metadata 126 on a separate device. Existing mechanisms for managing the file metadata 126 can be leveraged to reduce computational waste.

Figure 2A:
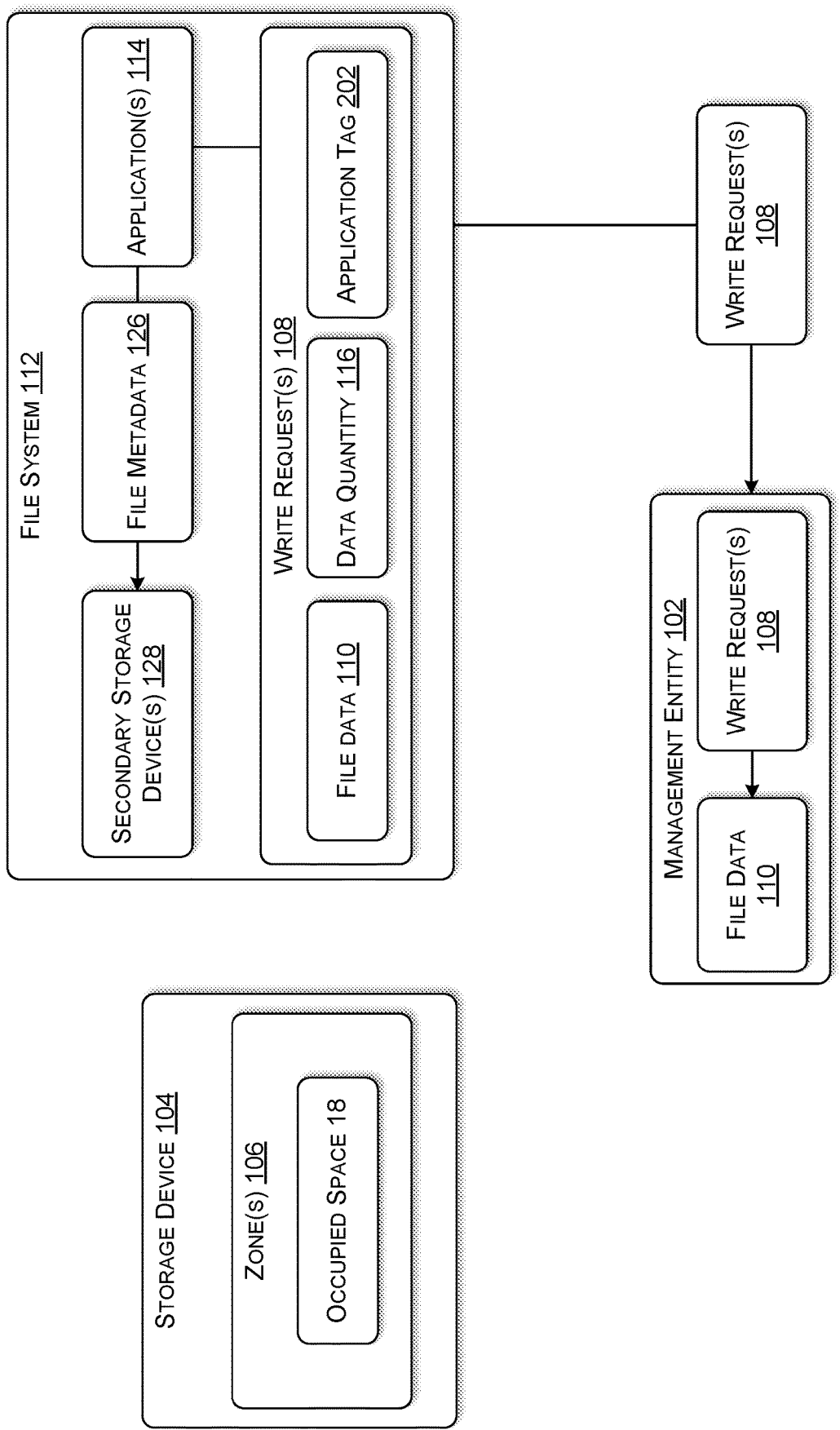
FIG. 2A illustrates an example system for interfacing a file system with a zoned namespace storage device in a first state of operation.

Turning now to FIG. 2A, an example data flow 200 illustrating additional aspects of the system for interfacing with zoned storage devices 104 is shown and described. As shown in FIG. 2A, an application 114 wishes to store file data 110 at the storage device 104. Accordingly, the application generates a write request 108 containing the file data 110 and a data quantity 116. The application 114 simultaneously generates file metadata 126 associated with the file data 110, the file metadata 126 defining various characteristics of the file data 110. As discussed above, the file metadata 126 is stored at a secondary storage device 128. In an alternative example, several different applications 114 each generate a corresponding write request 108. Each write request 108 can accordingly include an application tag 202 indicating the application 114 which generated the write request 108. In still another example, one application 114 generates a plurality of write requests 108. As such, the write requests 108 can be grouped by the application 114 which generated them using the application tag 202.

Figure 2B:
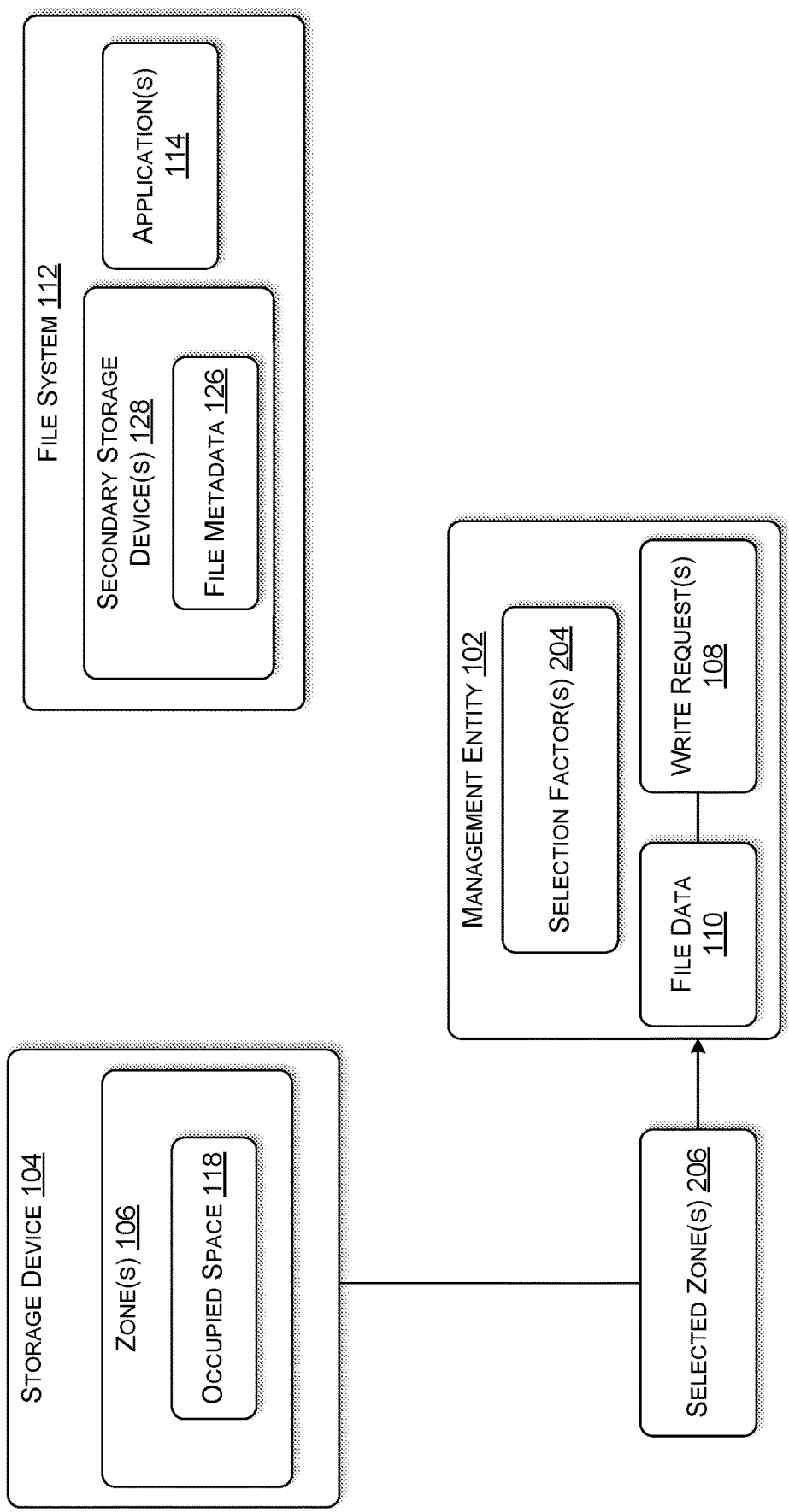
FIG. 2B illustrates an example system for interfacing a file system with a zoned namespace storage device in a second state of operation.

As mentioned above, the management entity 102 can be configured to select zones 106 from the storage device 104 for each write request using various criteria. As shown in FIG. 2B, the management entity 102 is configured with selection factors 204 which inform the decision-making process of the management entity 102. The selection factors 204 can be automatically generated by the system 100 and/or configured manually by a user such as a system engineer or administrator. In one example, the selection factors 204 direct the management entity 102 to store file data 110 in zones 106 that contain file data 110 that originate from the same application 114. For instance, documents from a word processing application 114 can be stored in the same zone 106 or group of zones 106. By grouping file data 110 in this way, the management entity 102 can improve efficiency of the storage device 104 by reducing latencies when reading file data 110.

Figure 2C:
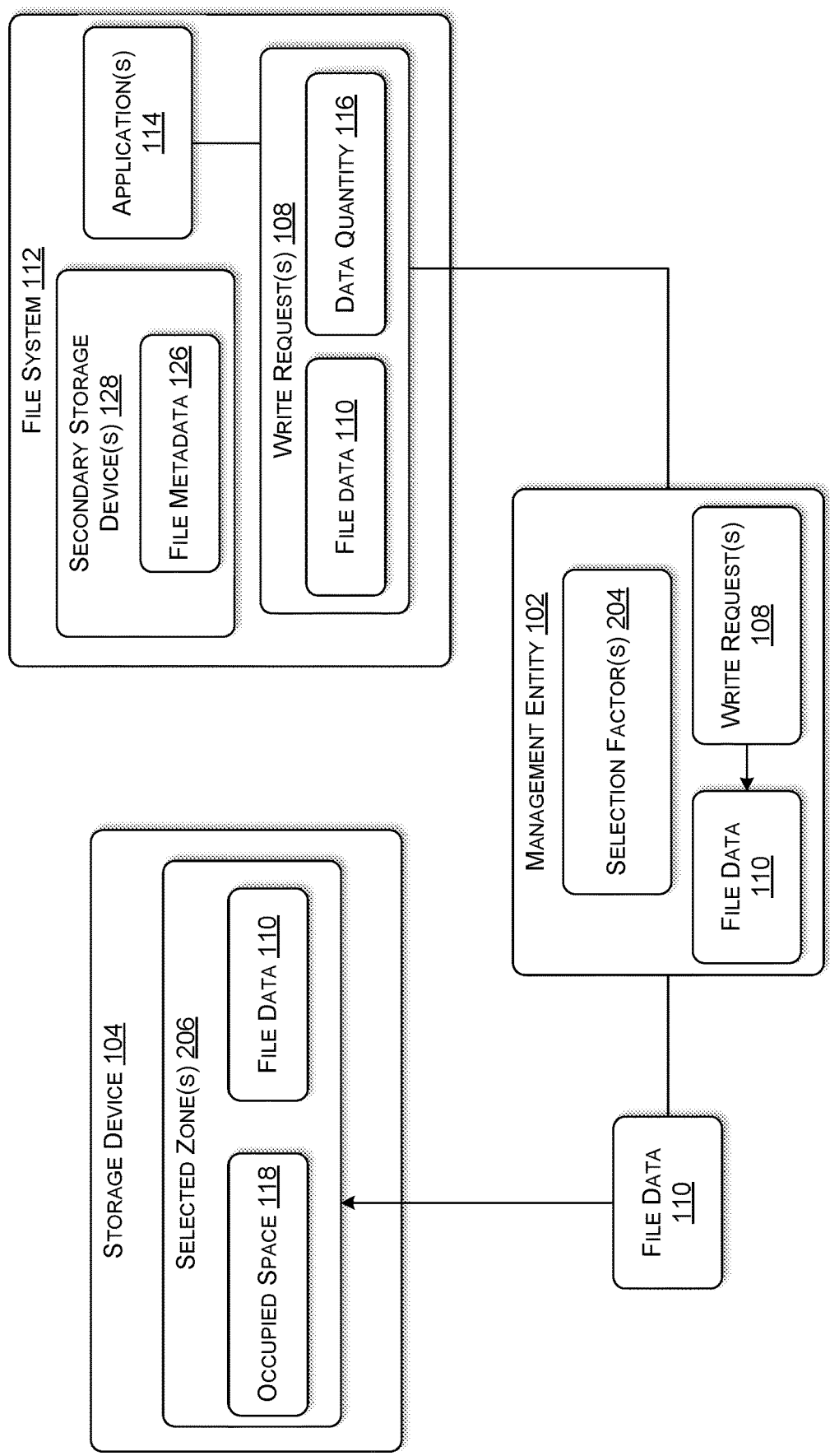
FIG. 2C illustrates an example system for interfacing a file system with a zoned namespace storage device in a third state of operation.

In another example, the selection factors 204 direct the management entity 102 to group select zones 106 using a metric of the relevance of the file data 110 to other file data 110 within the occupied space 118 of a zone 106. As will be elaborated upon below, the management entity 102 can determine the relevance of file data 110 based on the originating application 114, the content of the file data 110, and other criteria. Consequently, file data 110 for related files can be grouped together for quick access thereby increasing device level parallelism and thus overall efficiency of the file system 112. Accordingly, the management entity 102 uses the selection factors 204 to determine a selected zone 206 of the zones 106 to which the file data 110 is written as shown in FIG. 2C.

Furthermore, the management entity 102 may be configured to select multiple selected zones 206. In one example, the management entity 102 receives a plurality of write requests 108. Accordingly, the management entity 102 assigns a selected zone 206 to the file data 110 for each of the plurality of write requests 108. Alternatively, based on the selection factors 204, the management entity 102 may determine that the file data 110 for the plurality of write request 108 should be grouped (e.g., they originate from the same application 114). In response, the management entity 102 assigns a single selected zone 206 to store all the file data 110 of the plurality of write requests 108.

Figure 2D:
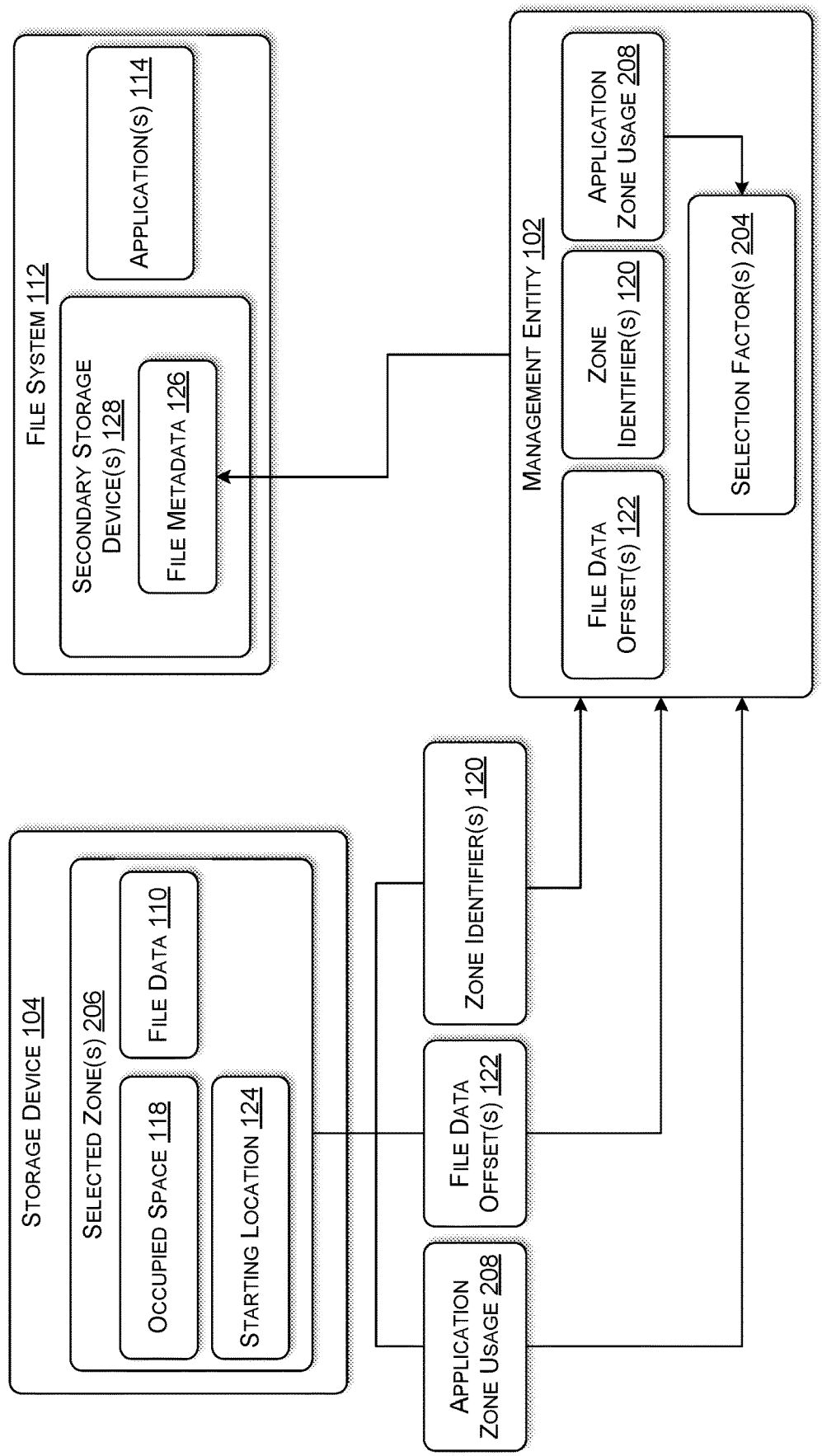
FIG. 2D illustrates an example system for interfacing a file system with a zoned namespace storage device in a fourth state of operation.

Turning now to FIG. 2D, the storage device 104 completes the write operation storing the file data 110 within the selected zone 206. In response, the storage device 104 returns information items to the management entity 102 associated with the stored file data 110. In one example, as shown in FIG. 2D, the storage device 104 returns a zone identifier 120 indicating the selected zone 206, as discussed above, the zone identifier 120 can utilize any suitable identification method such as a numbering scheme. In addition, the storage device 104 returns a file data offset 122 indicating a location of the file data 110 within the selected zone 206. As described above, the file data offset 122 is expressed as a location relative to a starting location 124 of the selected zone 206 to indicate the beginning of the file data 122. The file data offset 122 can also include an ending location of the file data as discussed above.

Moreover, the storage device 104 can return a plurality of zone identifiers 120 and file data offsets 122 in response to a plurality of write requests 108. In one example, the management entity 102 assigns a plurality of selected zones 206 for file data 110 of a plurality of write requests 108. Accordingly, the file data 110 of the plurality of write requests 108 are dispatched to the storage device 104 for writing to each corresponding selected zone 206. Following completion of the write operation, the storage device returns a zone identifier 120 and a file data offset 122 for each write request 108. In an alternative example, the storage device 104 returns all zone identifiers 120 and file data offsets 122 at the same time following completion all the write operations. As will be elaborated upon below, the timing of this information return can be adjusted by a priority of the write request 108 among other factors.

In addition, the storage device 104 can be configured to return an application zone usage 208 for the selected zone 206 in response to a write request 108. The application zone usage 208 can define a proportion of the occupied space 118 that is utilized by an application 114. In one example, the application zone usage 208 for the selected zone 206 indicates that eighty percent of the occupied space 118 is utilized by a word processing application 114 after a write operation appending the file data 110 to the selected zone 206. The application zone usage 208 can subsequently be returned to the management entity 102 to update and/or adjust the selection factors 204. In this way, the management entity 102 is enabled to track usage of the storage device 104 on a per application 114 basis. Moreover, the management entity 102 can continuously maintain the selection factors 204 to reflect the current state of the storage device 104, enabling optimal selection of the selected zones 206.

Consequently, if an application 114 of file system 112 wishes to access the file data 110 at a later point in time, the management entity 102 can reduce latencies and even enhance security by only accessing zones 106 that contain the file data 110 for the application 114. In a specific example, a user utilizes a video editing application 114 to work on a video project. The file data 110 for the video project, as indicated by the application zone usage 208, is stored at a specific set of selected zones 206. Accordingly, when the user attempts to open the video project, the management entity 102 can limit storage device 104 accesses by the video editing application 114 to those selected zones 206. Subsequently, as the user saves file data 110 for the video project, the file data 110 is appended to the same set of selected zones 206. As needed (e.g., the selected zones 206 fill up), the management entity 102 can incrementally expand the set of selected zones 206 to accommodate additional file data 110 generated by the video editing application 114.

Subsequently, the management entity 102 updates the file metadata 126 with the information returned by the storage device 104. As mentioned above, the file metadata 126 can define a location of the associated file data 110. It should be understood that the zone identifier 120 and the file data offset 122 of the file data 110 constitute the location of the file data 110. Through the file metadata 126, the file system 112 can quickly access the file data 110 at a later point in time also know as reading.

Figure 3:
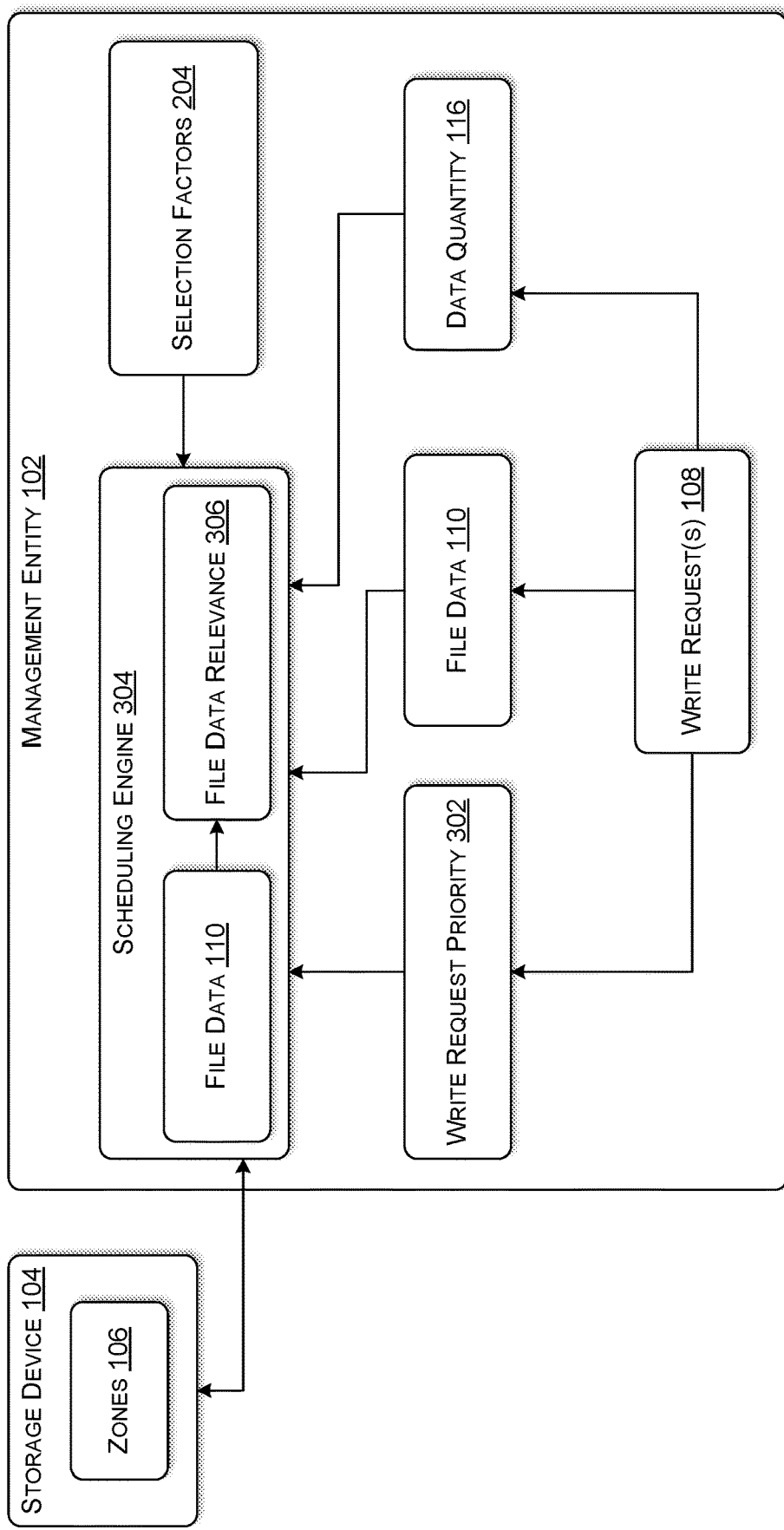
FIG. 3 illustrates additional aspects of an example management entity for interfacing a file system with a zoned namespace storage device.

Turning now to FIG. 3, additional aspects of the management entity 102 are shown and described utilizing various illustrative examples. As noted above, the management entity 102 can be one or several hardware and/or software components that receive and process write requests 108 from a file system 112. To process a write request 108, the management entity 102 extracts the file data 110 to be written as well as a data quantity 116 defining the size of the file data 110 (e.g., one hundred megabytes). In addition, the management entity 102 can determine and quantify an importance of a particular write request via a write request priority 302. In various examples, the write request priority 302 is a numerical score that is assigned to the associated write request 108 and which is calculated automatically or manually assigned. In one example, the write request priority 302 is calculated by the management entity 102 based on one or a combination of the application 114 that generated the write request 108, a user identifier associated with the write request 108, the data quantity 116, a target storage device 104, the number of outstanding write operations at the target storage device 104, and so forth.

In various examples, if a write request priority 302 meets or exceeds a threshold write request priority, the associated write request 108 is considered by the management entity 102 as a high priority. Conversely, if the write request priority 302 falls below the threshold write request priority, the write request 108 is considered as a normal or low priority. Moreover, the write request priority 302 for a write request 108 can be configured manually. For example, a user utilizing a word processing application 114 may designate a particular file as important. In response, file data 110 of the file is assigned a write request priority 302 that exceeds the threshold hold write request priority. Consequently, the file data 110 of the important file is considered by the management entity 102 as high priority.

Accordingly, the file data 110, the data quantity 116, and the write request priority 302 are provided to a scheduling engine 304 where the file data 110 is staged while a zone 106 is selected for storing the file data 110. In one example, the scheduling of write operations is based on the write request priority 302. Naturally, file data 110 that is a high priority is scheduled and dispatched to the storage device 104 before file data 110 that is a low priority. Moreover, the scheduling engine 304 can be configured to utilize stricter or more specific selection factors 204 for file data 110 with a high write request priority 302 in comparison to file data 110 with a low write request priority 302.

In various examples, the scheduling engine 304 determines a file data relevance 306 when evaluating the zones 106 for storing the file data 110. The file data relevance 306 can be a metric that quantifies the level of relation between the file data 110 and the data already present within a given zone 106. In various examples, the file data relevance 306 can be a numerical representation of this relation (e.g., a score, a percentage). The file data relevance 306 and the selection factors 204 can be utilized by the scheduling engine 304 to select zones 106 for storing the file data 110. The file data relevance 306 can be calculated based on the source of the file data 110, the source of file data 110 in the occupied space 118, a user identifier associated with the write request 108, the creation date of the file data 110, the data quantity 116, and so forth.

In one example, the scheduling engine 304 detects that the file data 110 was created on the same date, by the same user, and using the same application 114 as other data stored within a zone 106. Accordingly, this results in a file data relevance 306 that exceeds a threshold relevance defined by the selection factors 204 (e.g., eighty percent). The zone 106 is then selected by the management entity 304 to store the file data 110. Conversely, if the file data relevance 306 does not meet or exceed the threshold file data relevance, the zone 106 is rejected and the scheduling engine 304 proceeds to select a different zone 106.

Figure 4:
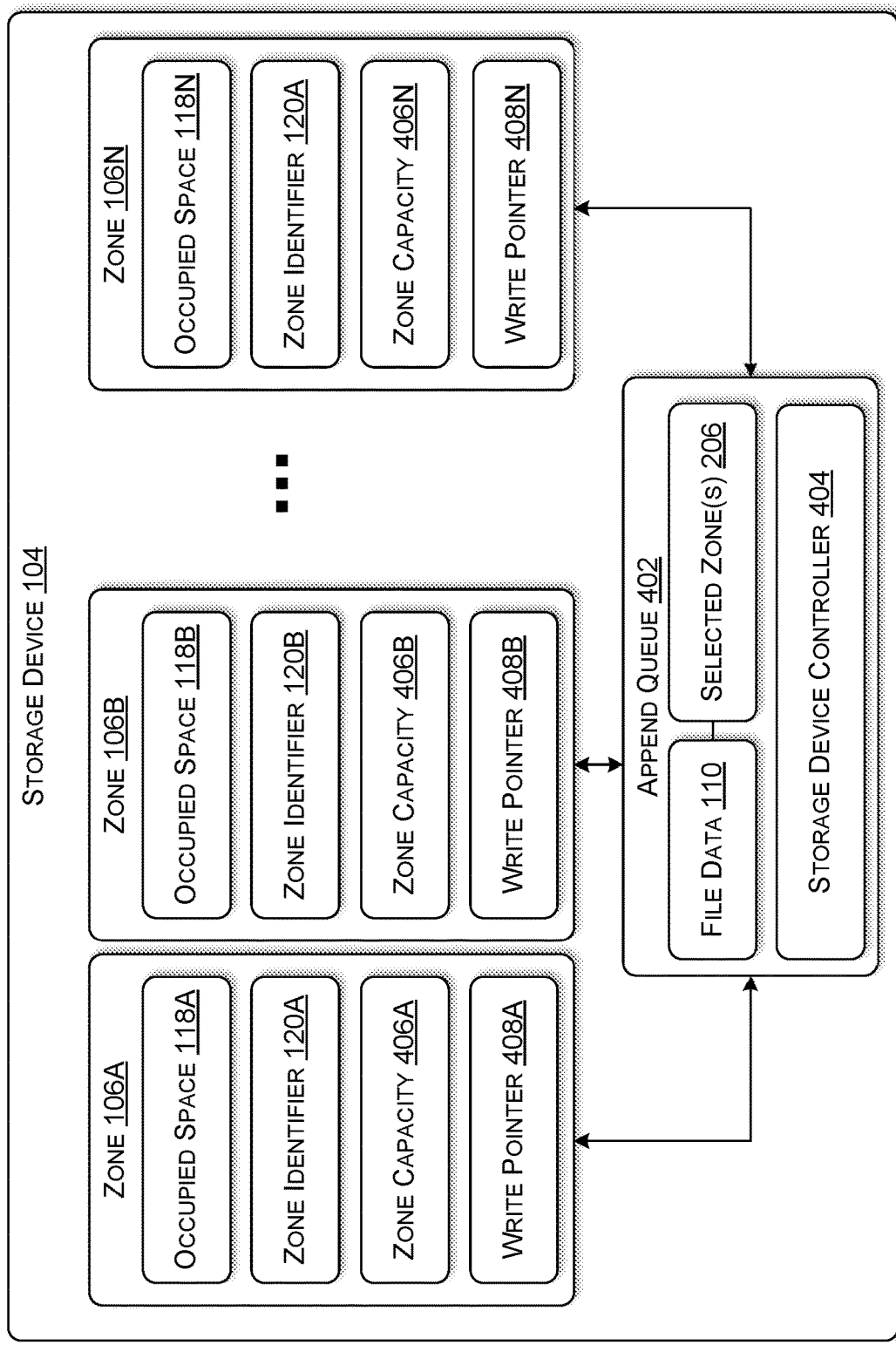
FIG. 4 illustrates additional aspects of an example zoned namespace storage device.

Proceeding now to FIG. 4, additional aspects of a storage device 104 containing a plurality of zones 106 are shown and described. As discussed above, the storage device 104 utilizes a different architecture in comparison to conventional solid-state storage devices. While typical SSDs expose individual blocks of storage, the storage device 104 contains a plurality of zones 106A-106N. The zones 106 enable the storage device 104 to align digital data such as the file data 110 with the physical storage media that make up the zones 106. This enables the storage device 104 to expose dramatically increased capacity in comparison to conventional SSDs. However, by organizing the storage device 104 into zones 106, typical mechanisms for interfacing with SSDs are incompatible with the zones 106 of the storage device 104. In addition, existing mechanisms for interfacing with zoned storage devices 104 negatively impact efficiency by enforcing serial write operations.

In contrast, as discussed above, utilizing a management entity 102 to select zones 106 append file data 110, and extract a file data offset 122 enables non-serial dispatch of write operations to the storage device 104. To support appending operations, the storage device 104 includes an append queue 402 which receives file data 110 and selected zones 206 from the management entity 102. The append queue 402 is then responsible for appending the file data 110 to the zone 106 indicated by the selected zone 206. In various examples, the operations of the append queue 402 are managed by a storage device controller 404. The storage device controller is configured to schedule write operations as well as manage read operations and erasing zones 106 in the event of a file data 110 deletion. In addition, the storage device controller 404 is responsible for returning information to the management entity such as zone identifiers 120 and file data offsets 122.

As discussed above, the storage device 104 includes a plurality of zones 106A-106N. Accordingly each zone includes a zone capacity 406A-406N that indicates the total storage of an associated zone 106A-106N. In various examples, the zone capacity 406 is expressed in terms of standard units such as megabytes (e.g., one hundred megabytes). In addition, zone capacities 406A-406N can be the same across all the zones 106A-106N of the storage device 104. Conversely, zone capacities 406 can vary between zones 106. In one example, the zone capacity 406A for a first zone 106A is one hundred megabytes while the zone capacity 406B for a second zone 406N is two hundred megabytes.

Furthermore, the zone capacities 406 can be adjusted by the storage device controller 404 to suite various contexts. In one specific example, a user is rendering a large video project in a video editing application 114. Consequently, the storage device controller 404 and/or the management entity 102 detects a volume of file data 110 being saved from the video editing application 114 exceeds a threshold volume of data (e.g., four gigabytes per minute). In response, the storage device controller and/or the management entity 102 coordinate to configure zones 106 that comfortably accommodate the high volume of file data 110 writing. For instance, the storage device controller 404 and/or the management entity 102 increase the zone capacity 406A and 406B for zones 106A and 106B to store the video project while other zones 106N remain unmodified.

To append file data 110, the append queue 402 dispatches the file data 110 to the zone 106A indicated by the selected zone 206. At the zone 106A, the point at which the file data 110 is appended is indicated by a write pointer 408A. The write pointer 408A is placed at the ending point of the occupied space 118A. Stated another way, the write pointer 408A indicates the beginning of the available zone capacity 406A. Accordingly, the file data 110 is appended at the location indicated by the write pointer 408A. Subsequently, the write pointer 408A is moved to the ending point of the file data 110 (e.g., a sum of the occupied space 118 and the data quantity 116). Following this write operation, as discussed above, the zone identifier 120A and the file data offset 122 are returned to the management entity 102 for updating the file metadata 126. At this point, the zone 106A is ready to perform the next write operation in the append queue 402.

Figure 5:
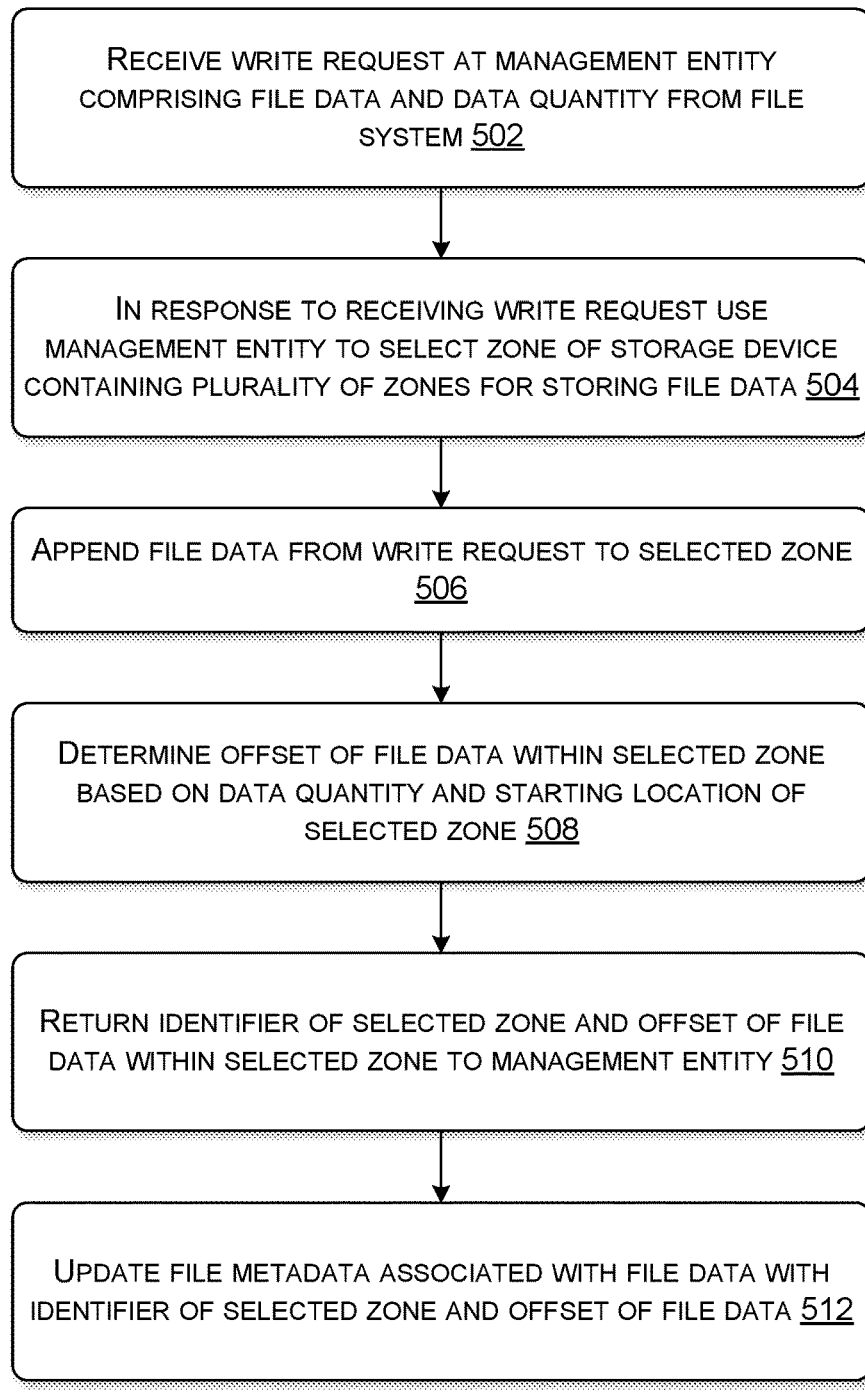
FIG. 5 is a flow diagram showing aspects of an example routine for interfacing a file system with a zoned namespace storage device in a first state of operation.

Turning now to FIG. 5, aspects of a routine 500 for enabling efficiency interfacing with zoned storage devices are shown and described. With reference to FIG. 5, routine 500 begins at operation 502 where a management entity 102 receives a write request 108 from a file system 112. As discussed above, the write request 108 can contain file data 110 and a data quantity 116 indicating a size of the file data 116.

Next, at operation 504, in response to receiving the write request, the management entity 102 selects a zone 106 from a plurality of zones 106 at a storage device 104. In many examples, the storage device 104 is a zoned namespace (ZNS) device. However, it should be understood that the storage device 104 can be any storage device 104 utilizing zones 106 of storage media.

Then, at operation 506, the file data 110 is appended to the selected zone 206. As shown and described above, the management entity 102 dispatches the file data 110 to an append queue 402 at the storage device 104. The file data 110 is then directed to the selected zone 206 by a storage device controller 404 and appended by the storage device.

Next, at operation 508, a file data offset 122 is determined for the file data 110 within the selected zone 206 following completion of the write operation. The file data offset 122 is calculated based on the data quantity 116 and is expressed in relation to a starting location 124 of the selected zone 206.

Then, at operation 510, a zone identifier 120 and the file data offset 122 are returned to the file system 112 in response to completion of the write operation. As described above, the zone identifier 120 and the file data offset 122 are extracted from the storage device 104 by the management entity 102 and then transmitted to the file system 112. In an alternative example, the storage device 104 automatically transmits the zone identifier 120 and the file data offset 122 to the management entity 102 following completion of the write operation.

Finally, at operation 512, the file system 112 records the zone identifier 120 and the file data offset 122 in file metadata 126 associated with the file data 110. In various examples, the file metadata 126 is stored in a secondary storage device 128 that is separate and different from the storage device 104.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 can be implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the illustration may refer to the components of the figures, it should be appreciated that the operations of the routine 500 may be also implemented in many other ways. For example, the routine 500 may be implemented, at least in part, by a processor of another remote computer or a local circuit. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 6:
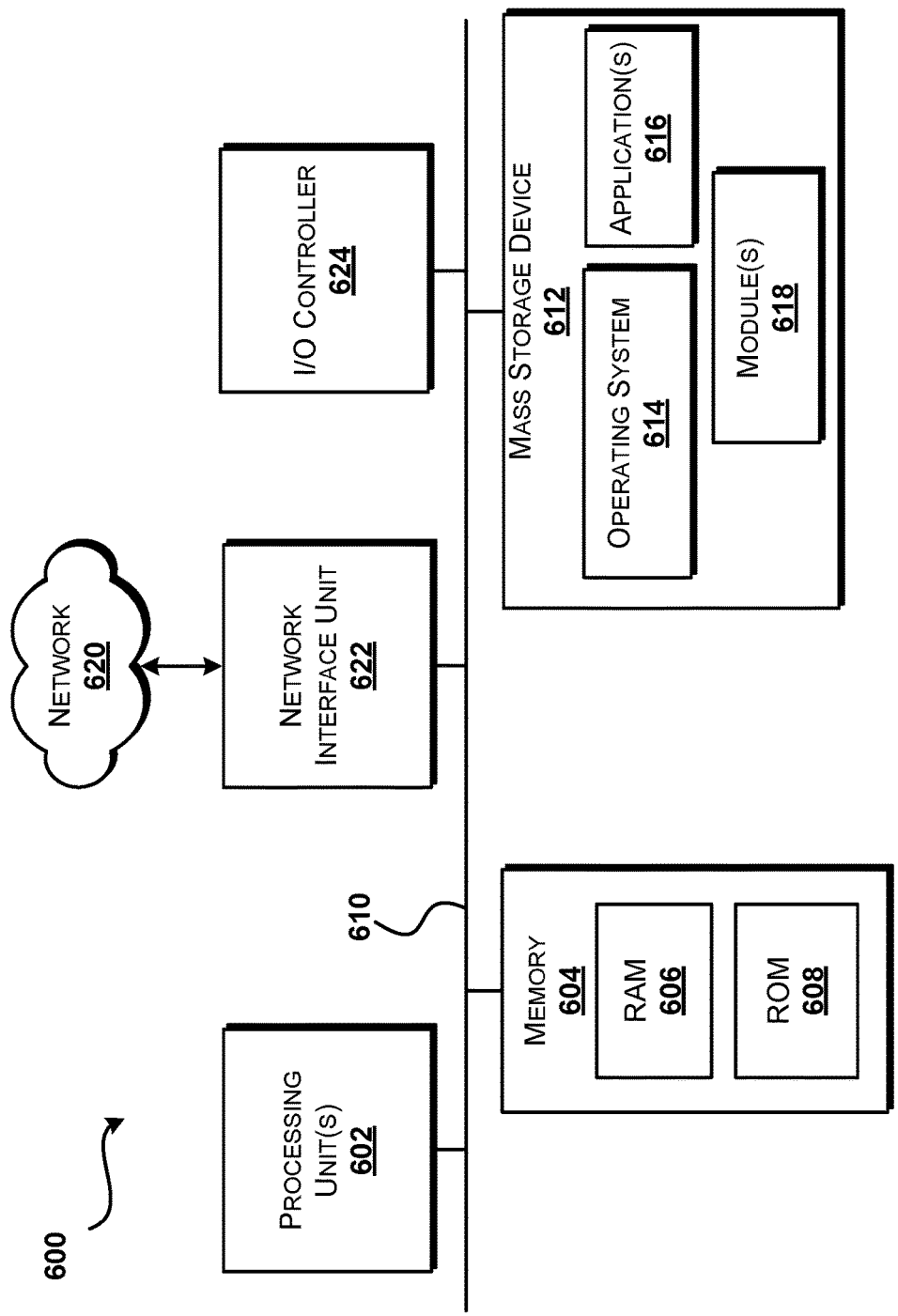
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing unit(s) 602, a system memory 604, including a random-access memory 606 (RAM) and a read-only memory (ROM) 608, and a system bus 610 that couples the memory 604 to the processing unit(s) 602. The processing units 602 may also comprise or be part of a processing system. In various examples, the processing units 602 of the processing system are distributed. Stated another way, one processing unit 602 of the processing system may be located in a first location (e.g., a rack within a datacenter) while another processing unit 602 of the processing system is located in a second location separate from the first location.

Processing unit(s), such as processing unit(s) 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

Figure 7:
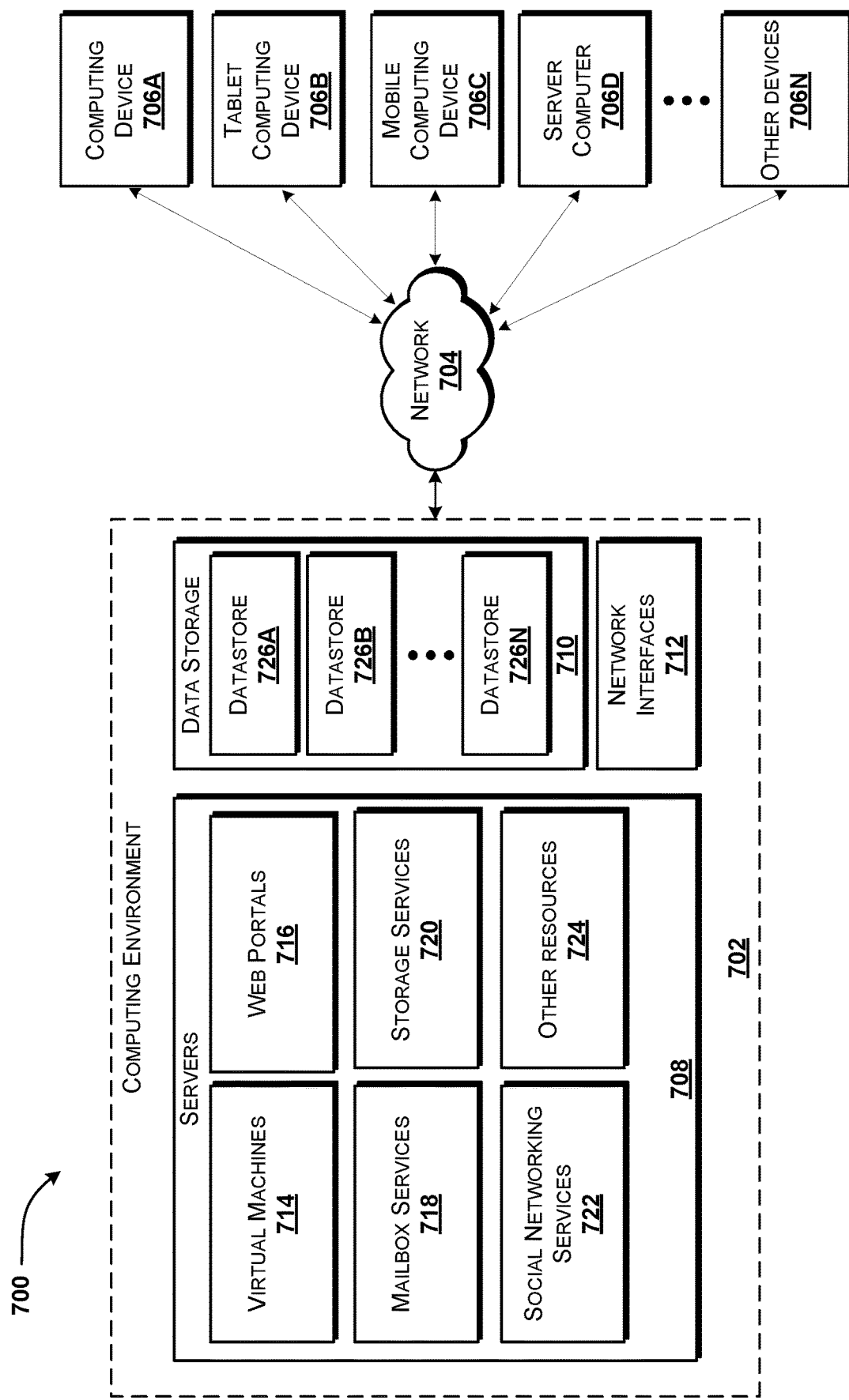
FIG. 7 is a diagram illustrating an example distributed computing environment capable of implementing aspects of the techniques and technologies presented herein.

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 610, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method comprising: receiving, at a management entity by a processing system, a write request from a file system, the write request comprising file data and a data quantity; in response to receiving the write request, selecting, by the management entity, a zone of a storage device containing a plurality of zones for storing the file data of the write request; appending the file data of the write request to the zone; determining an offset of the file data within the zone based on the data quantity and a starting location of the zone; returning an identifier of the zone and the offset of the file data within the zone to the management entity; and updating file metadata associated with the file data with the identifier of the zone and the offset of the file data.

Example Clause B, the method of Example Clause A, wherein the storage device is a zoned namespace storage device.

Example Clause C, the method of Example Clause A or Example Clause B, further comprising: receiving a plurality of additional write requests from the file system at the management entity; scheduling an append operation for respective file data of each write request of the plurality of additional write requests for storage at the zone; and returning the identifier of the zone and a respective offset of the respective file data for each write request of the plurality of additional write requests to the file system.

Example Clause D, the method of any one of Example Clause A through C, wherein the plurality of zones is a first plurality of zones, and the storage device contains a second plurality of zones, the method further comprising: receiving a plurality of additional write requests from the file system at the management entity; selecting the second plurality of zones of the storage device; appending respective file data of each write request of the plurality of additional write requests to a corresponding one of the second plurality of zones; and returning a zone identifier and a file data offset for each write request of the plurality of additional write requests to the file system.

Example Clause E, the method of any one of Example Clause A through D, wherein respective file data of additional write requests originating from the same application as the write request are stored within the zone of the storage device.

Example Clause F, the method of any one of Example Clause A through E, wherein the file metadata is stored on a second storage device that is different from the storage device containing the plurality of zones.

Example Clause G, the method of any one of Example Clause A through F, wherein a plurality of write requests is transmitted to the storage device simultaneously.

Example Clause H, a system comprising: a processing system; and a computer-readable medium having encoded thereon computer-readable instructions that, when executed by the processing system, cause the system to: receive, at a management entity by a processing system, a write request from a file system, the write request comprising file data and a data quantity; in response to receiving the write request, select, by the management entity, a zone of a storage device containing a plurality of zones for storing the file data of the write request; append the file data of the write request to the zone; determine an offset of the file data within the zone based on the data quantity and a starting location of the zone; return an identifier of the zone and the offset of the file data within the zone to the management entity; and update file metadata associated with the file data with the identifier of the zone and the offset of the file data.

Example Clause I, the system of Example Clause H, wherein the storage device is a zoned namespace storage device.

Example Clause J, the system of Example Clause H or Example Clause I, wherein the computer-readable instructions further cause the system to: receive a plurality of additional write requests from the file system at the management entity; schedule an append operation for respective file data of each write request of the plurality of additional write requests for storage at the zone; and return the identifier of the zone and a respective offset of the respective file data for each write request of the plurality of additional write requests to the file system.

Example Clause K, the system of any one of Example Clause H through J, wherein the plurality of zones is a first plurality of zones, and the storage device contains a second plurality of zones, the computer-readable instructions further causing the system to: receive a plurality of additional write requests from the file system at the management entity; select the second plurality of zones of the storage device; append respective file data of each write request of the plurality of additional write requests to a corresponding one of the second plurality of zones; and return a zone identifier and a file data offset for each write request of the plurality of additional write requests to the file system.

Example Clause L, the system of any one of Example Clause H through K, wherein respective file data of additional write requests originating from the same application as the write request are stored within the zone of the storage device.

Example Clause M, the system of any one of Example Clause H through L, wherein the file metadata is stored on a second storage device that is different from the storage device containing the plurality of zones.

Example Clause N, the system of any one of Example Clause H through M, wherein a plurality of write requests is transmitted to the storage device simultaneously.

Example Clause O, a computer-readable storage medium having encoded thereon computer-readable instructions that when executed by a processing system cause a system to: receive, at a management entity by a processing system, a write request from a file system, the write request comprising file data and a data quantity; in response to receiving the write request, select, a zone of a storage device containing a plurality of zones for storing the file data of the write request; append the file data of the write request to the zone; determine an offset of the file data within the zone based on the data quantity and a starting location of the zone; return an identifier of the zone and the offset of the file data within the zone to the management entity; and update file metadata associated with the file data with the identifier of the zone and the offset of the file data.

Example Clause P, the computer-readable storage medium of Example Clause O, wherein the storage device is a zoned namespace storage device.

Example Clause Q, the computer-readable storage medium of Example Clause O or Example Clause P, wherein the computer-readable instructions further cause the system to: receive a plurality of additional write requests from the file system at the management entity; schedule an append operation for respective file data of each write request of the plurality of additional write requests for storage at the zone; and return the identifier of the zone and a respective offset of the respective file data for each write request of the plurality of additional write requests to the file system.

Example Clause R, the computer-readable storage medium of any one of Example Clause O through Q, wherein the plurality of zones is a first plurality of zones, and the storage device contains a second plurality of zones, the computer-readable instructions further causing the system to: receive a plurality of additional write requests from the file system at the management entity; select the second plurality of zones of the storage device; append respective file data of each write request of the plurality of additional write requests to a corresponding one of the second plurality of zones; and return a zone identifier and a file data offset for each write request of the plurality of additional write requests to the file system.

Example Clause S, the computer-readable storage medium of any one of Example Clause O through R, wherein respective file data of additional write requests originating from the same application as the write request are stored within the zone of the storage device.

Example Clause T, the computer-readable storage medium of any one of Example Clause O through S, wherein a plurality of write requests is transmitted to the storage device simultaneously.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different resource requirement recommendations).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

We claim:

1. A method comprising:
   receiving, at a management entity by a processing system at a first time, a first write request from a file system, the first write request comprising first file data and a first data quantity;
   receiving, at the management entity at a second time after the first time, a second write request from the file system, the second write request comprising second file data and a second data quantity;
   in response to receiving the first write request and the second write request, determining that a first priority for the first write request is less than a second priority for the second write request;
   in response to determining the first priority for the first write request is less than the second priority for the second write request, processing the second write request before the first write request by:
      selecting, by the management entity, a zone of a storage device containing a plurality of zones for storing the second file data of the second write request;
      appending the second file data of the second write request to the zone;
      determining an offset of the second file data within the zone based on the second data quantity and a starting location of the zone;
      returning an identifier of the zone and the offset of the second file data within the zone to the management entity; and
      updating file metadata associated with the second file data with the identifier of the zone and the offset of the second file data.

2. The method of claim 1, further comprising:
   receiving a plurality of additional write requests from the file system at the management entity;
   scheduling an append operation for respective file data of each write request of the plurality of additional write requests for storage at the zone; and returning the identifier of the zone and a respective offset of the respective file data for each write request of the plurality of additional write requests to the file system.

3. The method of claim 1, wherein respective file data of additional write requests originating from a same application as the write request are stored within the zone of the storage device.

4. The method of claim 1, wherein a plurality of write requests is transmitted to the storage device simultaneously.

5. The method of claim 1, wherein:
the first priority is a first numerical score;
the second priority is a second numerical score;
the first numerical score is calculated by the management entity based on one or more of an application that generated the first write request, a user identifier associated with the first write request, and the first data quantity; and
the second numerical score is calculated by the management entity based on one or more of an application that generated the second write request, a user identifier associated with the second write request, and the second data quantity.

6. The method of claim 1, wherein the management entity receives the first priority and the second priority from the file system in response to a manual configuration of a first file and a second file respectively associated with the first write request and the second write request.

7. The method of claim 1, wherein the second write request is processed before the first write request in response to further determining that the second priority meets or exceeds a threshold write request priority.

8. A system comprising:
a processing system; and
a computer-readable medium having encoded thereon computer-readable instructions that, when executed by the processing system, cause the system to:
receive, at a management entity by a processing system at a first time, a first write request from a file system, the first write request comprising first file data and a first data quantity;
receive, at the management entity at a second time after the first time, a second write request from the file system, the second write request comprising second file data and a second data quantity;
in response to receiving the first write request and the second write request, determine that a first priority for the first write request is less than a second priority for the second write request;
in response to determining the first priority for the first write request is less than the second priority for the second write request, process the second write request before the first write request by:
selecting, by the management entity, a zone of a storage device containing a plurality of zones for storing the second file data of the second write request;
appending the second file data of the second write request to the zone;
determining an offset of the second file data within the zone based on the second data quantity and a starting location of the zone;
returning an identifier of the zone and the offset of the second file data within the zone to the management entity; and
updating file metadata associated with the second file data with the identifier of the zone and the offset of the second file data.

9. The system of claim 8, wherein the computer-readable instructions further cause the system to:
receive a plurality of additional write requests from the file system at the management entity;
schedule an append operation for respective file data of each write request of the plurality of additional write requests for storage at the zone; and
return the identifier of the zone and a respective offset of the respective file data for each write request of the plurality of additional write requests to the file system.

10. The system of claim 8, wherein respective file data of additional write requests originating from a same application as the write request are stored within the zone of the storage device.

11. The system of claim 8, wherein a plurality of write requests is transmitted to the storage device simultaneously.

12. The system of claim 8, wherein:
the first priority is a first numerical score;
the second priority is a second numerical score;
the first numerical score is calculated by the management entity based on one or more of an application that generated the first write request, a user identifier associated with the first write request, and the first data quantity; and
the second numerical score is calculated by the management entity based on one or more of an application that generated the second write request, a user identifier associated with the second write request, and the second data quantity.

13. The system of claim 8, wherein the management entity receives the first priority and the second priority from the file system in response to a manual configuration of a first file and a second file respectively associated with the first write request and the second write request.

14. The system of claim 8, wherein the second write request is processed before the first write request in response to further determining that the second priority meets or exceeds a threshold write request priority.

15. A computer-readable storage medium having encoded thereon computer-readable instructions that when executed by a processing system cause a system to:
receive, at a management entity by a processing system at a first time, a first write request from a file system, the first write request comprising first file data and a first data quantity;
receive, at the management entity at a second time after the first time, a second write request from the file system, the second write request comprising second file data and a second data quantity;
in response to receiving the first write request and the second write request, determine that a first priority for the first write request is less than a second priority for the second write request;
in response to determining the first priority for the first write request is less than the second priority for the second write request, process the second write request before the first write request by:
selecting, by the management entity, a zone of a storage device containing a plurality of zones for storing the second file data of the second write request;
appending the second file data of the second write request to the zone;
determining an offset of the second file data within the zone based on the second data quantity and a starting location of the zone;

returning an identifier of the zone and the offset of the second file data within the zone to the management entity; and updating file metadata associated with the second file data with the identifier of the zone and the offset of the second file data.

16. The computer-readable storage medium of claim 15, wherein the computer-readable instructions further cause the system to:

receive a plurality of additional write requests from the file system at the management entity;

schedule an append operation for respective file data of each write request of the plurality of additional write requests for storage at the zone; and return the identifier of the zone and a respective offset of the respective file data for each write request of the plurality of additional write requests to the file system.

17. The computer-readable storage medium of claim 15, wherein respective file data of additional write requests originating from a same application as the write request are stored within the zone of the storage device.

18. The computer-readable storage medium of claim 15, wherein:

the first priority is a first numerical score;

the second priority is a second numerical score;

the first numerical score is calculated by the management entity based on one or more of an application that generated the first write request, a user identifier associated with the first write request, and the first data quantity; and the second numerical score is calculated by the management entity based on one or more of an application that generated the second write request, a user identifier associated with the second write request, and the second data quantity.

19. The computer-readable storage medium of claim 15, wherein the management entity receives the first priority and the second priority from the file system in response to a manual configuration of a first file and a second file respectively associated with the first write request and the second write request.

20. The computer-readable storage medium of claim 15, wherein the second write request is processed before the first write request in response to further determining that the second priority meets or exceeds a threshold write request priority.

* * * * *